(No Model.)
E. J. SMITH.
WIRE FENCE.
No. 266,545. Patented Oct. 24, 1882.
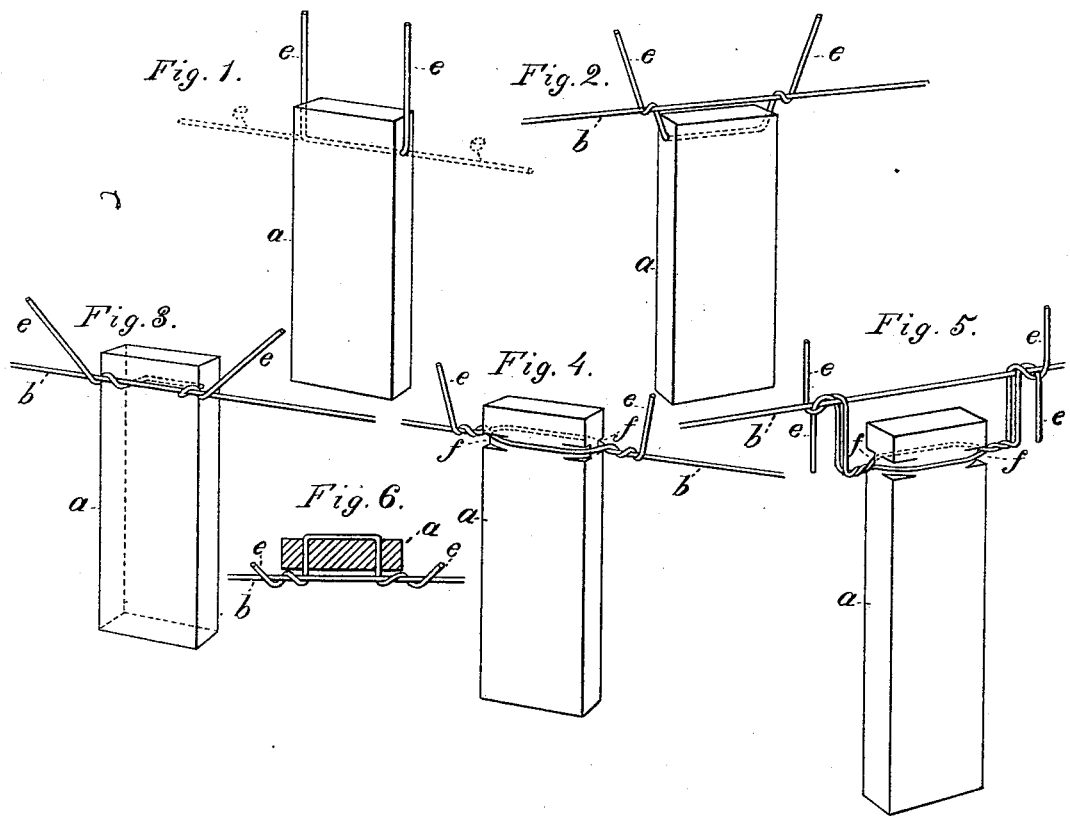
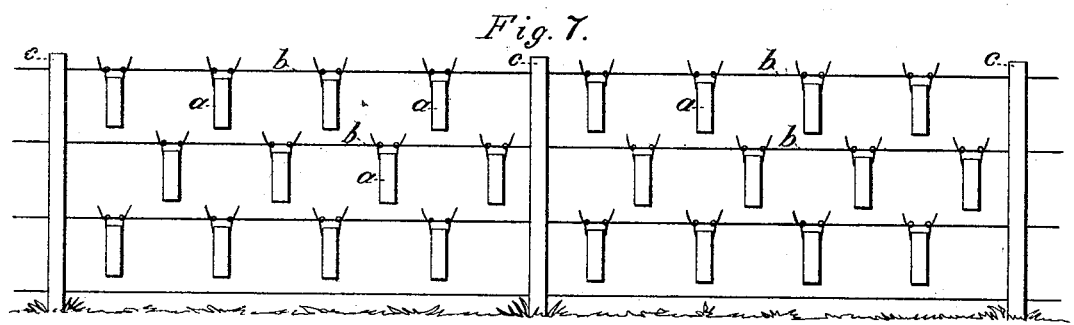
WITNESSES
Villette Anderson.
Philip C. Masi.
INVENTOR
E. J. Smith
by Anderson & Smith
his ATTORNEYS
N. PETERS, Photo-Lithographer, Washington, D. C.

United States Patent Office.

ELDRIDGE J. SMITH, OF WILLIAMSPORT, PENNSYLVANIA, ASSIGNOR OF ONE-HALF TO JOHN SCHWER, JR., OF SAME PLACE.

WIRE FENCE.

SPECIFICATION forming part of Letters Patent No. 266,545, dated October 24, 1882.

Application filed September 2, 1882. (No model.)

*To all whom it may concern:*

Be it known that I, ELDRIDGE J. SMITH, a citizen of the United States, and a resident at Williamsport, in the county of Lycoming and State of Pennsylvania, have invented a new and valuable Improvement in Wire Fences; and I do hereby declare that the following is a full, clear, and exact description of the construction and operation of the same, reference being had to the annexed drawings, making a part of this specification, and to the letters and figures of reference marked thereon.

Figure 1 of the drawings is a view of the tag with the securing-wire before the barbs as formed. Fig. 2 is a view of the tag attached to the fence-wire. Figs. 3, 4, 5, and 6 are detail views. Fig. 7 is a side elevation.

This invention has relation to that class of barbed fences in which swinging tags are employed to indicate to the stock the location of the fence, and thus prevent the stock from accidentally running against the barbs; and it consists in securing the tags to the fence-wire by a wire or wires, which, when twisted around the fence-wire, shall have projecting ends, which form the barbs, as will be hereinafter fully described and claimed.

Referring by letter to the accompanying drawings, $a$ designates the tag; $b$, the fence-wire, and $c$ the fence-posts. The tag is preferably notched at its upper end, in order that the securing-wires $d$, or a single securing-wire, $d'$, and the fence-wire $b$ may engage the notches or grooves to hold the tags in position. Where two wires are employed to secure the tags and form the barbs $e$ they are laid in the grooves $f$ and twisted at each edge of the tag. They are then bent and twisted around the fence-wire to form the barbs $e$. Where a single wire is used to form the barbs the fence-wire enters the groove in one face of the tag and the securing-wire lies in the other, as shown in Fig. 4. The tag may be perforated laterally near its upper end and the securing-wire passed through the perforation and twisted around the fence-wire to form the barbs.

Another method of carrying out the invention consists in passing the securing-wire through the tag from its face side to form a staple, as shown in Fig. 3, and then twisting the ends of the staple thus formed around the fence-wire to form the barbs. This method is also shown in section in Figs. 8, 6.

The utility of the invention is obvious, the tag being secured to the fence and the barbs formed by the projecting ends of the securing wire or wires.

A narrow strip of board has been suspended from the upper wire of a fence; twisted tags combined with fence-wires between the barbs by spring-catches have been used; and a cattle-protector for wire fences, consisting of a series of tablets of wood or other suitable material having grooved edges and arranged between and held by the strands which form a twisted fence-wire, is also old, and I claim neither of these constructions.

Having thus fully described my invention, what I claim is—

The combination, with a tag and a fence-wire, of a securing wire or wires, the projecting ends of which form the barbs, substantially as specified.

In testimony that I claim the above I have hereunto subscribed my name in the presence of two witnesses.

ELDRIDGE J. SMITH.

Witnesses:
THEO. MUNGEN,
JAMES J. SHEEHY.